Feb. 27, 1968 — A. J. WAIBEL — 3,370,545
VALVE ASSEMBLY FOR HIGH PRESSURE COMPRESSORS AND THE LIKE
Filed March 14, 1966 — 2 Sheets-Sheet 1
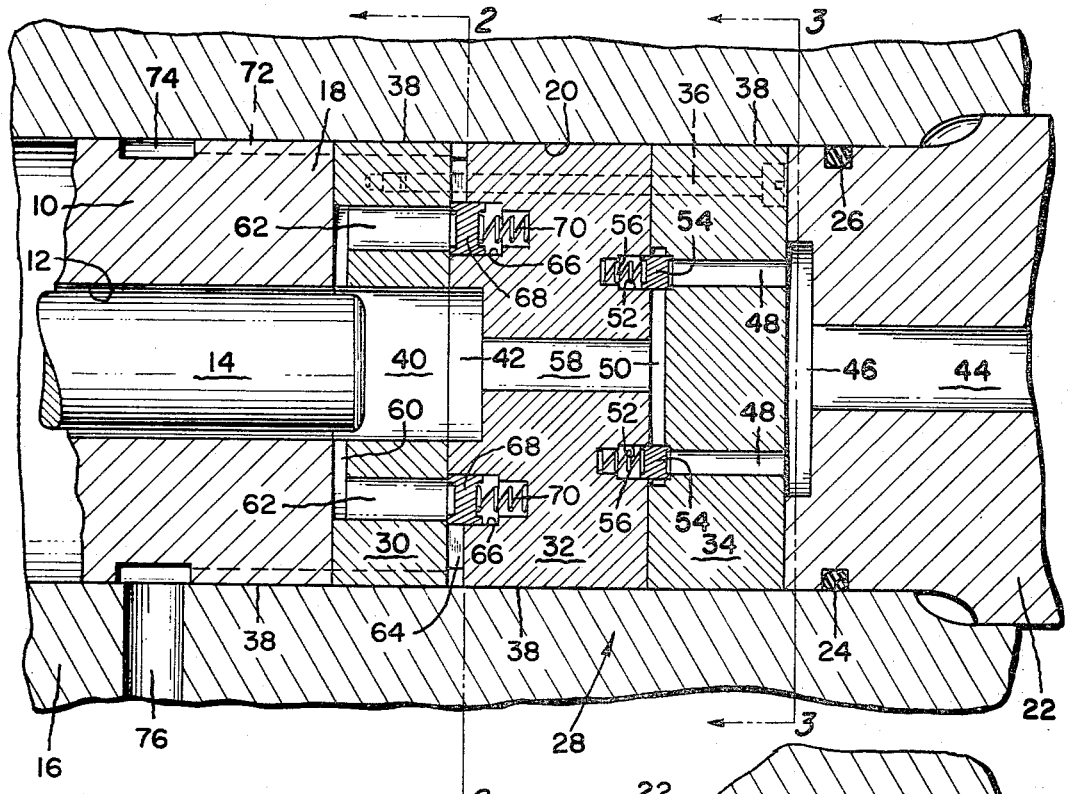
FIG. 1
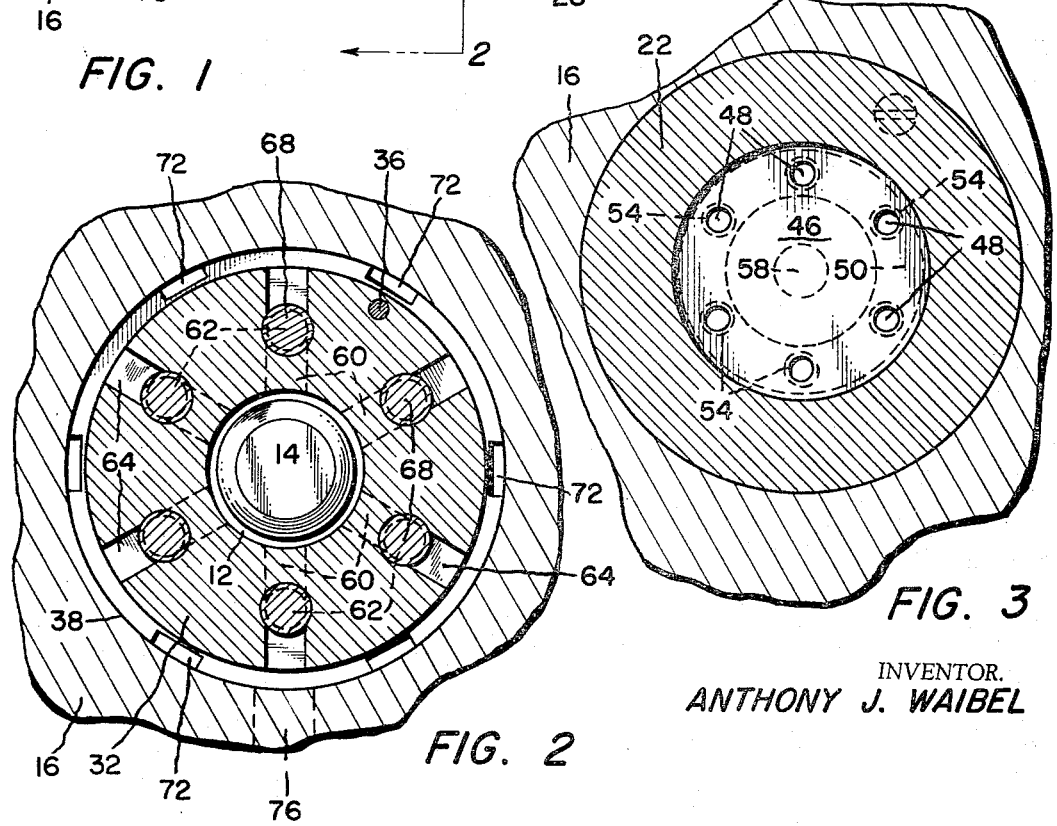
FIG. 2
FIG. 3
INVENTOR.
ANTHONY J. WAIBEL

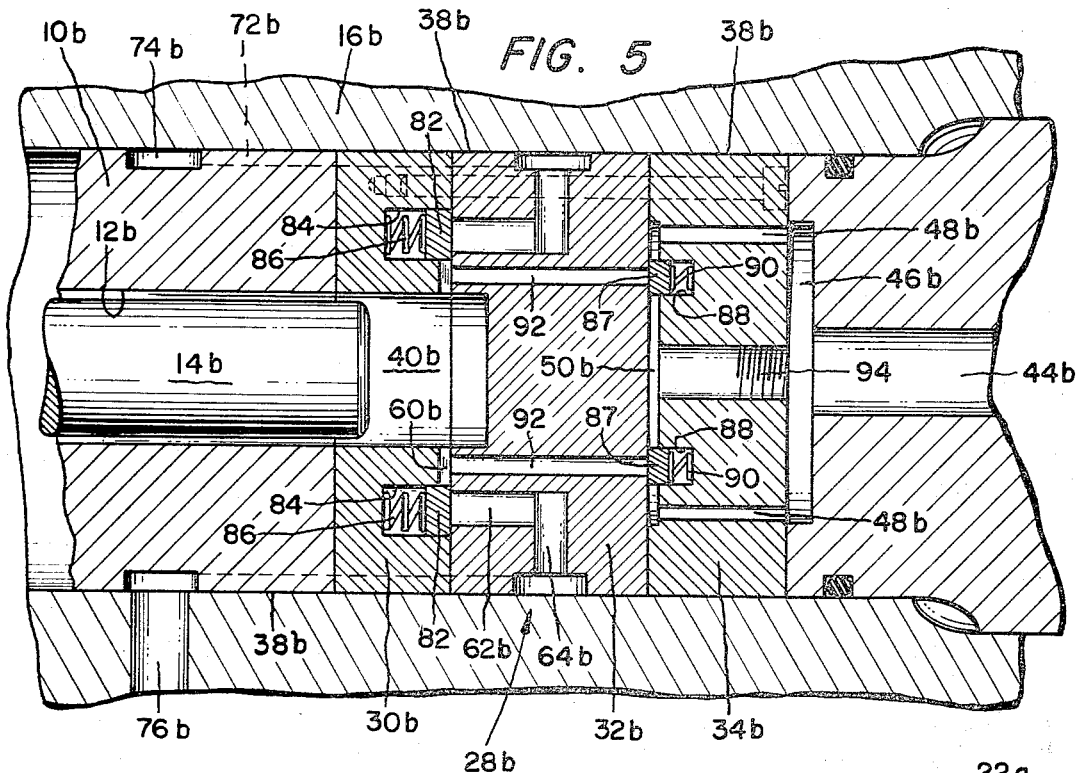
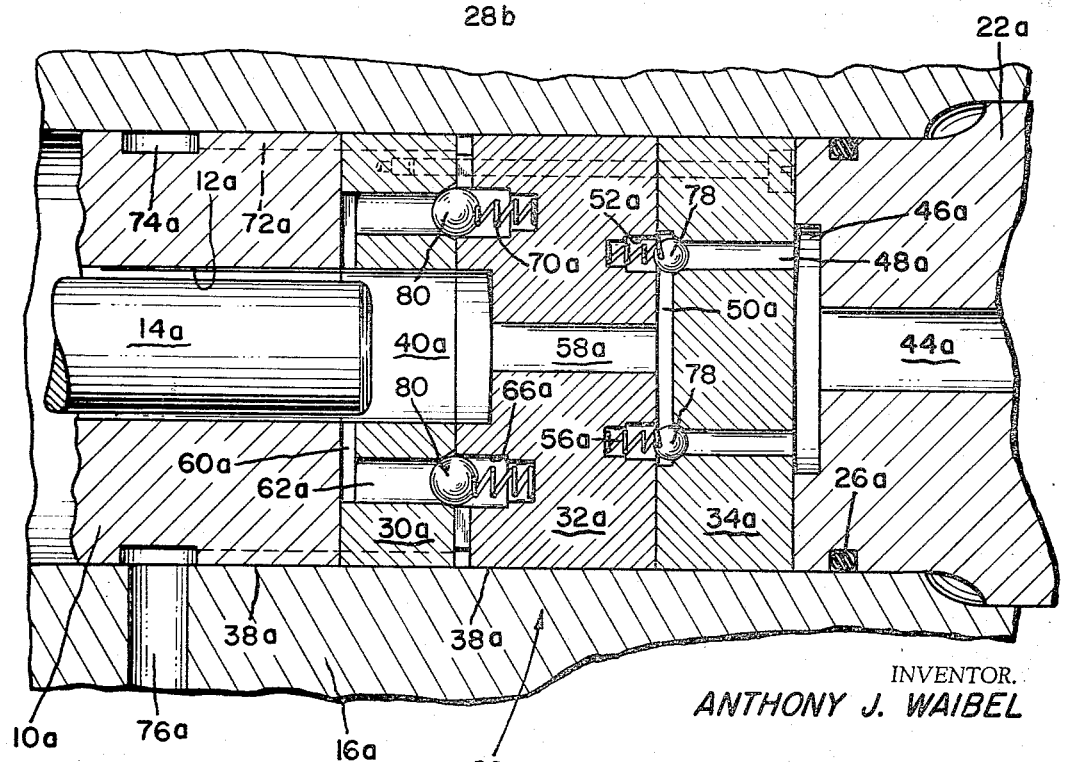

United States Patent Office 3,370,545
Patented Feb. 27, 1968

3,370,545
VALVE ASSEMBLY FOR HIGH PRESSURE
COMPRESSORS AND THE LIKE
Anthony J. Waibel, Painted Post, N.Y., assignor to
Ingersoll-Rand Company, New York, N.Y., a corporation of New Jersey
Filed Mar. 14, 1966, Ser. No. 534,253
5 Claims. (Cl. 103—228)

ABSTRACT OF THE DISCLOSURE

A valve assembly for a high pressure, reciprocating compressor which includes a cylinder body containing a longitudinal cylinder bore. The valve assembly comprises a valve body, having a bore forming an extension of the cylinder bore, which encloses pluralities of inlet and discharge valves. A casing means peripherally surrounds the valve body and at least a portion of the cylinder body and is closely spaced therefrom to provide a single continuous annular confined space which receives pressurized fluid to maintain the valve body and at least a portion of the cylinder body in compression at all times.

---

This invention relates to valve assemblies and has more particular reference to the provision of a new and improved valve assembly which is particularly constructed and arranged for controlling the flow of fluid in a cylinder of a high pressure, reciprocating compressor or the like.

Conventionally, many high pressure, reciprocating compressors, such as, for example, polyethylene compressors, are required to compress fluids to a gauge pressure within the range of from 25,000 to 60,000 pounds per square inch. Currently, there is an increasing necessity that these high pressure compressors be constructed with a minimum of cylinders, thereby requiring that each of the compressor cylinders be formed of an enlarged size. These enlarged cylinders have fluid capacities far in excess of the fluid capacities of cylinders of prior high pressure compressors. Thus, the valve assemblies previously employed for controlling the flow of fluid into and out of the cylinders of prior high pressure compressors are generally inadequate for controlling the flows of fluid which may be handled by these enlarged cylinders.

In the construction of low pressure compressors, the fluid flow problems arising from an increase in cylinder size have generally been overcome by the enlargement of the cylinder inlet and discharge valves to form such of sizes commensurate with the increased size of the cylinder. In those instances in which further enlargement of the inlet and discharge valves has been impossible due to valve assembly size restrictions and valve lift area limitations, additional inlet and outlet valves have been added to handle the increased flow requirements of the cylinder.

In high pressure, reciprocating compressors, however, valve size has already been increased to a maximum in many instances. Furthermore, the addition of more inlet and discharge valves is generally impossible in conventional valve assemblies due to the limitations imposed upon the size of the valve assemblies and the requirement that the valve assemblies, and in some instances the cylinder, be maintained under external fluid compression to avoid damage resulting from the loads imposed thereon. Thus, neither of these conventional techniques for increasing cylinder inlet and discharge flow can satisfactorily be employed in the construction of the valve assemblies required to handle the increased fluid flow of the enlarged cylinders of high pressure, reciprocating compressors.

An object of the present invention is to provide a new and improved valve assembly which is particularly constructed and arranged for controlling the flow of fluid in the enlarged cylinders of a high pressure, reciprocating compressor or the like.

Another object of the invention is to provide a new and improved valve assembly of this type which is constructed and arranged to provide external fluid compression of the valve assembly and of the cylinder which it accompanies.

Another object is to provide a new and improved valve assembly of this type which is flexible in valve location, relatively compact in configuration, and highly efficient and dependable in operation.

These objects, and the other objects and advantages of the invention which will become apparent from the following description taken in connection with the accompanying drawings, are accomplished by the provision of a new and improved valve assembly for a high pressure, reciprocating compressor which includes a cylinder body having a cylinder bore longitudinally therein and a piston disposed within the cylinder bore for reciprocating movement therein. The valve assembly comprises a valve body enclosed by a casing means which extends peripherally around the cylinder body and the valve body. The external surfaces of the valve body and at least a portion of the cylinder body and the adjacent internal surface of the casing means are such that an annular confined space is formed intermediate such portion of the cylinder body and the casing means and intermediate the valve body and the casing means. This confined space is connected to receive fluid under pressure sufficient to maintain the valve body and such portion of the cylinder body in compression at all times. A plurality of inlet passages are formed within the valve body for conveying fluid to the cylinder bore and each contain an inlet valve which controls the flow of such fluid to the cylinder bore. A plurality of discharge passages are formed in the valve body for conveying fluid discharged by the cylinder bore from the latter and each contain a discharge valve which controls the flow of such fluid from the cylinder bore.

Referring to the drawings wherein several embodiments of the invention have been shown for the purposes of illustrating the present invention:

FIG. 1 is a longitudinal sectional view illustrating one embodiment of the valve assembly which is provided by the present invention in combination with a compressor cylinder;

FIG. 2 is a sectional view taken on line 2—2 of FIG. 1, looking in the direction of the arrows;

FIG. 3 is a sectional view taken on line 3—3 of FIG. 1, looking in the direction of the arrows;

FIG. 4 is a longitudinal sectional view illustrating an alternative embodiment of the valve assembly of the present invention in combination with a compressor cylinder; and FIG. 5 is a longitudinal sectional view illustrating another alternative embodiment of the valve assembly of the present invention in combination with a compressor cylinder.

Referring more particularly to the drawings wherein similar reference characters designate corresponding parts throughout the several views, FIGS. 1 through 3 illustrate an embodiment of the present invention in combination with a cylinder of a high pressure compressor. The high pressure compressor cylinder illustrated in FIGS. 1 through 3 comprises a cylinder body 10 having a cylinder bore 12 which extends longitudinally through the cylinder body 10 and contains a reciprocating piston 14.

The cylinder body 10 is circumferentially surrounded by a sleeve casing 16 which extends longitudinally forward of the head end 18 of the cylinder body 10. The casing 16 includes a cylindrical casing bore 20 which is disposed forward of the head end 18 of the cylinder body 10 such that the head end 18 bounds one longitudinal end of the casing bore 20. The casing bore 20 is aligned with the head end 18 and is formed with a cross-sectional width substantially equal to that of the head end 18. The longitudinal end of the casing bore 20 opposite to that bounded by the head end 18 is closed by a cylindrical head member 22 which is circumferentially surrounded by the casing 16.

The head member 22 is provided with an annular groove 24 which extends circumferentially around the head member 22 intermediate the latter and the casing 16. A sealing ring 26 is located within the annular groove 24 in engagement with the casing 16 and the head member 22 to prevent fluid leakage from the casing bore 20 between the casing 16 and the head member 22.

The embodiment of the valve assembly which is illustrated in FIGS. 1 through 3 is designated generally as 28. The valve assembly 28 comprises a valve body formed from three cylindrical members 30, 32, 34 which are disposed transversely within the casing bore 20 intermediate the cylinder body 10 and the head member 22. The members 30, 32, 34 are joined in face-to-face contact by a securing member such as a screw 36 and are of sufficient length such that the outer faces of the members 30, 34 abut the head end 18 of the cylinder body 10 and the head member 22, respectively. The members 30, 32, 34 are each formed with a common cross-sectional width which is substantially equal to the cross-sectional width of the head end 18 of the cylinder body 10. The members 30, 32, 34 are, however, a sufficiently loose fit in the casing bore 20 to provide an annular fluid space 38 between the members 30, 32, 34 and the casing 16. Similarly, the cylinder body 10 is also a sufficiently loose fit within the casing 16 such that the annular fluid space 38 extends circumferentially around the cylinder body 10. The annular fluid space 38, as will be later herein more specifically described receives leakage fluid to place the members 30, 32, 34 and the cylinder body 10 under external fluid compression.

The member 30 is provided with an axial bore 40 which is aligned with the cylinder bore 12 in the cylinder body 10 and forms an extension of the cylinder bore 12. The member 32 is provided with an axial recess 42 in its face contacting the member 30, the recess 42 being aligned with the bore 40 and forming the extreme forward extension of the cylinder bore 12. Thus, in the embodiment of the invention illustrated in FIGS. 1 through 3, the cylinder bore 12 extends through the cylinder body 10 and is extended internally of the members 30 and 32 which are separate from the cylinder body 10.

The head member 22 is provided with an axial fluid passage 44 which communicates at one of its longitudinal ends with a circular fluid chamber 46 formed in the face of the head member 22 abutting the member 34. The opposing longitudinal end of the fluid passage 44 is operatively connected to a source (not shown) of the fluid to be compressed by the piston 14 to receive such fluid and convey it to the fluid chamber 46. The source of the fluid to be compressed may be the proceeding cylinder of the high pressure compressor or, in the instance of the first cylinder of the high pressure compressor, may be external to the compressor.

The member 34 includes a plurality of radially disposed fluid passages 48 which extend longitudinally through the member 34 into communication with the fluid chamber 46. The face of the member 34 abutting the member 32 is provided with a circular fluid chamber 50 which communicates adjacent its radially outward limits with the fluid passages 48. A valve chamber 52 is formed in the member 32 in alignment with each of the fluid passages 48 in the member 34. A poppet-type valve member 54 is slidably disposed within each of the valve chambers 52 and biased by a spring 56 to normally prevent fluid communication between the fluid passages 48 and the fluid chamber 50. A fluid passage 58 is axiallly located in the member 32 with its opposing longitudinal ends communicating with the recess 42 in the member 32 and the fluid chamber 50 in the member 34 for conveying fluid which is supplied to the fluid chamber 50 axially into the cylinder bore 12. The fluid passages 44, 48, 58 and the fluid chambers 46, 50 form the inlet passage means for supplying the fluid to be compressed by the piston 14 to the cylinder bore 12.

The face of the member 30 abutting the head end 18 of the cylinder body 10 includes an annular fluid passage 60 which extends radially outward from the bore 40 formed in the member 30. A plurality of fluid passages 62 are formed longitudinally through the member 30 at the radially outward end of the annular fluid passage 60 and communicate with the annular fluid passage 60 at one of their longitudinal ends. The opposing longitudinal end of each of the fluid passages 62 communicates with a fluid passage 64, formed in the face of the member 32 contacting the member 30, which extends radially outward from its respective communicating fluid passage 62. A valve chamber 66 is formed in the member 32 in alignment with each of the fluid passages 62. A poppet-type discharge valve member 68 is slideably disposed within each of the valve chambers 66 and biased by a spring 70 towards the member 30 to normally prevent fluid flow between the fluid passages 62 and 64.

The radially outward end of each of the fluid passages 64 communicates with the annular fluid space 38 for conveying fluid discharged from the cylinder bore 12 to the annular fluid space 38 to place the valve assembly 28 and the cylinder body 10 under external fluid compression. The radially outward end of each of the fluid passages 64 also communicates with one longitudinal end of one of a plurality of fluid passages 72 which extend longitudinal along the cylinder body 10 intermediate the latter and the casing 16. The opposing longitudinal end of each of the discharge passages 72 communicates with an annular fluid passage 74 formed peripherally around the cylinder body 10 intermediate the ends thereof. The annular fluid passage 74, in turn, communicates with a fluid passage 76 formed in the casing 16. The fluid passage 76 is operatively connected to the succeeding cylinder of the high pressure compressor or, in the instance of the last cylinder of the compressor, to the apparatus receiving the fluid compressed by such cylinder to convey the discharged compressed fluid thereto. The fluid passages 60, 62, 64, 72, 74, and 76, thus, form the discharge passage means for conveying fluid compressed by the piston 14 from the high compressor cylinder illustrated in FIGS. 1 through 3.

In the operation of this illustrated high pressure compressor cylinder, during the intake stroke of the piston 14, the fluid to be compressed by the piston 14 flows through the fluid passage 44 and the fluid chamber 46 and thence, passes into the fluid passages 48. The pressure of the fluid in the fluid passages 48 overcomes the force of the springs 56, thereby sliding the poppet-type inlet valve members 54 into their respective valve chambers 52. This movement of the poppet-type inlet valve members 54 opens the fluid chamber 50 to communication with the fluid passages 48 and permits fluid flow from the fluid passages 48 to the fluid chamber 50. The fluid, thus entering the fluid chamber 50, flows through the fluid passage 58 into the cylinder bore 12. During the before-described intake stroke of the piston 14, the springs 70 urge the poppet-type discharge valve members 68 to close the discharge fluid passage of the cylinder, thus preventing fluid previously discharged from the cylinder bore 12 from backing up into the cylinder bore 12.

During the discharge stroke of the piston 14, the fluid compressed by the piston 14 flows from the cylinder bore 12 through the annular fluid passage 60 and thence passes into the fluid passages 62. The discharged fluid passing through the fluid passages 62 has, of course, only minor effect in placing the portion of the member 30 immediately surrounding the bore 40 under external fluid compression. The pressure of the discharged fluid overcomes the force of the springs 70 to slide the poppet-type discharge valve members 68 into their respective valve chambers 66. This movement of the poppet-type valve members 68 permits the discharged fluid in the fluid passages 62 to pass into the fluid passages 64. A minor portion of the fluid thus entering the fluid passages 64 passes therefrom into the annular fluid space 38 to place the valve assembly 28 and the cylinder body 10 under external fluid compression. The major portion of this compressed fluid, however, passes through the fluid passage 72, the annular fluid passage 74, and the fluid passage 76 which conveys the compressed fluid from the illustrated compressor cylinder. This portion of the compressed fluid provides additional external fluid compression of the cylinder body 10 and the valve assembly 28 during its passage through the fluid passage 72. The springs 56 maintain the poppet-type inlet valve members 54 closed to prevent compressed fluid from passing from the cylinder bore 12 through the inlet fluid passage means during the beforedescribed discharge stroke of the piston 14.

FIG. 4, wherein components similar to those previously described with reference to the embodiment of the invention illustrated in FIGS. 1 through 3 are designated by the reference character for their previously described similar part followed by the suffix a, illustrates an alternative embodiment of the present invention. In this embodiment of the invention, the poppet-type inlet valve members 54 shown in FIGS. 1 through 3 have been replaced by ball-type inlet valve members 78. Similarly, the poppet-type discharge valve members 68 shown in FIGS. 1 through 3 have been replaced by ball-type discharge valve members 80. Otherwise, however, the embodiment of the invention is identical to that shown in FIGS. 1 through 3 and hereinbefore described. Thus, the operation of this embodiment of the invention is believed to be alternative embodiment of the invention. In this embodiment of the invention illustrated in FIGS. 1 through 3.

FIG. 5, wherein parts similar to those previously described with reference to the embodiment of the invention illustrated in FIGS. 1 through 3 are designated by the reference character for their previously described similar part followed by the suffix b, illustrates another alternative embodiment of the invention. In this embodiment of the invention, the fluid passage 76b is operatively connected to the source (not shown) of the fluid to be compressed by the piston 14b to receive fluid from such source. The fluid passage 44b is operatively connected to the apparatus (not shown) receiving the fluid compressed by the piston 14b to convey the compressed fluid to such apparatus.

The inlet valve members 82 are slideably disposed within valve chambers 84 formed in the member 30b and are biased by springs 86 to prevent fluid in the cylinder bore 12b from backing up through the inlet fluid passage means. The inlet valve members 82, as illustrated in FIG. 5, are formed upon a valve plate. Alternatively, however, the inlet valve members 82 may be of the poppet or ball type. Similarly, the poppet and ball type inlet valve members illustrated in FIGS. 1 through 4 may be formed on a valve plate similar to that containing the inlet valve members 82.

The discharge valve members 87 are slideably disposed within valve chambers 88 formed in the member 34b and are biased by springs 90 to prevent fluid in the discharge passage means from backing up into the cylinder bore 12b. As illustrated in FIG. 5, the discharge valve members 87 are formed upon a valve plate. Alternatively, however, they may be of the poppet or ball type; and the discharge valve members illustrated in FIGS. 1 through 4 may be formed on a valve plate similar to that containing the discharge valve members 87. An axial fluid passage 94 is provided in the member 34b to facilitate the discharge of fluid from the cylinder bore 12b. The fluid passage 60b which communicates with the cylinder bore 12b is connected through a plurality of radially disposed, longitudinally extending fluid passages 92 to the fluid chamber 50b to convey discharged fluid to the latter.

In the operation of this embodiment of the invention, the fluid to be compressed by the piston 14b flows through the fluid passage 76b, the annular fluid passage 74b and the fluid passage 72b. The fluid thus passing through the fluid passage 72b places the cylinder body 10b and the valve assembly 28b under external fluid compression. A minor portion of this fluid passes into the annular fluid space 38b to place the valve assembly 28b and the cylinder body 10b under additional external fluid compression. The major portion of this fluid passes through the fluid passages 64b, 62b, and 60b into the cylinder bore 12b.

The fluid discharged from the cylinder bore 12b passes through the fluid passages 60b and 92, the valves 87, the fluid chamber 50b, the fluid passages 48b and 94, the fluid chamber 46b, and is discharged through the fluid passage 44b.

Although several embodiments of my invention have been illustrated and described in detail, it will be understood that my invention is not limited solely to these embodiments, but contemplates other embodiments and variations which utilize the teachings of my invention.

Having thus described my invention, I claim:

1. In combination with a high pressure, reciprocating compressor including a cylinder body containing a longitudinally extending cylinder bore, a reciprocating piston in said cylinder bore, and casing means peripherally enclosing at least a portion of said cylinder body and projecting longitudinally therefrom, a valve assembly comprising:

a valve body disposed in end-to-end relationship with said cylinder body and peripherally enclosed throughout its length by said casing means, said valve body including an end having a bore substantially the diameter of said cylinder bore connected to said cylinder bore to form an end extension thereof;

a plurality of inlet passages in said valve body and connected to said cylinder bore for supplying fluid thereto;

a plurality of discharge passages in said valve body and connected to said cylinder bore for conveying fluid therefrom;

a plurality of inlet valves for controlling the flow of fluid through said inlet passages, said inlet valves each being in one of said inlet passages and enclosed in said valve body;

a plurality of discharge valves for controlling the flow of fluid through said discharge passages, said discharge valves each being in one of said discharge passages and enclosed in said valve body;

one of said pluralities of valves being arranged peripherally around said bore in said valve body, the other thereof being adjacent the end of said valve body opposite to said valve body bore;

the external surfaces of said valve body and cylinder body and the internal surface of said casing means being closely spaced such that a narrow diameter, annular confined space is formed therebetween throughout the length of said valve body and at least a portion of said cylinder body; and said confined space communicating with one of said pluralities of passages to receive pressurized fluid whereby such pressurized fluid maintains said valve body and said latter mentioned portion of said cylinder body in compression at all times during the reciprocation of said piston.

2. A valve assembly according to claim 1, further comprising:

said one of said pluralities of valves being said plurality of discharge valves.

3. A valve assembly according to claim 1, further comprising:
said one of said pluralities of valves being said plurality of inlet valves.

4. A valve assembly according to claim 1, further comprising:
said confined space communicating with said discharge passages to receive pressurized fluid therefrom.

5. A valve assembly according to claim 1, further comprising:
said confined space being connected to receive fluid supplied through said inlet passages to said cylinder bore.

References Cited

UNITED STATES PATENTS

| 1,922,721 | 8/1933 | Weichhart | 103—153 |
| 2,140,956 | 12/1938 | Hall | 103—153 X |
| 2,503,478 | 4/1950 | Grime | 103—153 X |
| 2,770,972 | 11/1956 | Gratzmuller | 103—153 X |
| 3,128,941 | 4/1964 | Waibel | 103—153 X |

FOREIGN PATENTS 993,887   6/1965   Great Britain.

ROBERT M. WALKER, *Primary Examiner.*